March 28, 1961   L. D. LARSSON   2,976,791
MULTIPLE CAMERA SUPPORT
Filed Oct. 13, 1958
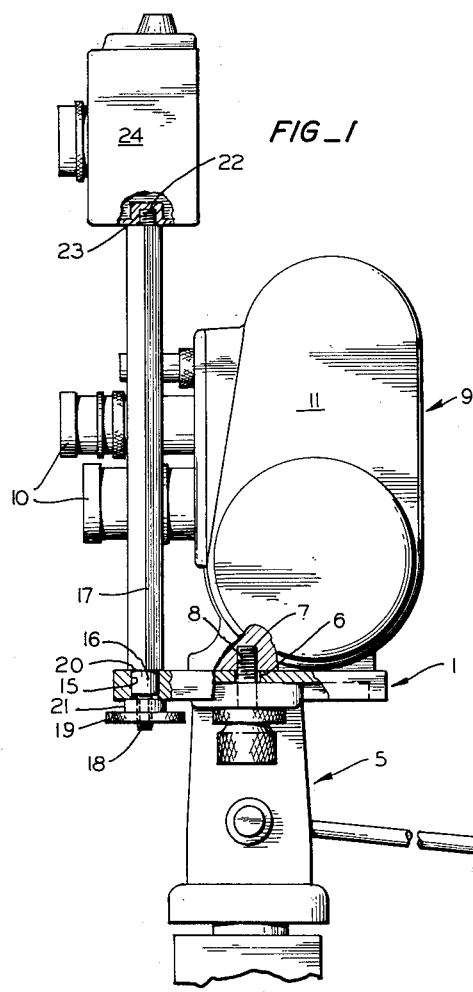
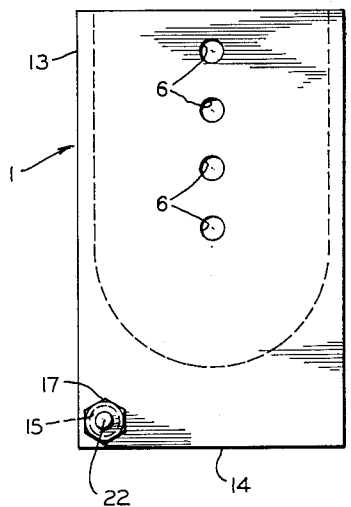
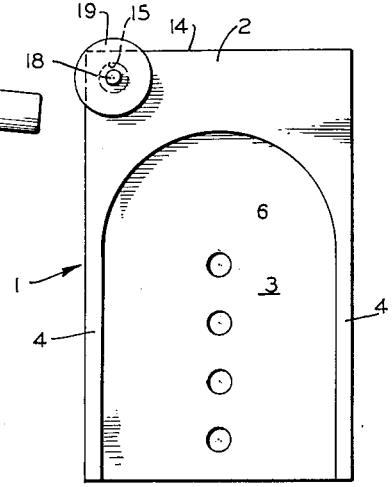
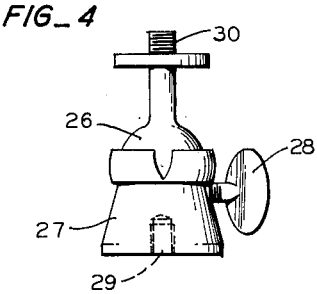
INVENTOR.
LEO D. LARSSON
BY
Boyken, Mohler & Wood
ATTORNEYS

United States Patent Office 2,976,791
Patented Mar. 28, 1961

2,976,791

MULTIPLE CAMERA SUPPORT

Leo D. Larsson, 27 Hattie St., San Francisco, Calif.

Filed Oct. 13, 1958, Ser. No. 766,776

1 Claim. (Cl. 95—86)

This invention relates to a multiple camera support, and has for one of its objects the provision of a simple, economically made, easily mounted, rigid multiple camera support that is adapted to be releasably secured by the conventional screw in a tripod head to such head, and to releasably secure a movie camera rigidly onto said support, and which support carries means adapted to releasably secure a second still camera thereto in a position in which the still camera is readily accessible to the operator and may be set, or arranged, to take a still picture of identically the same scene that is being taken by the movie camera. Furthermore, the support for the still camera is positioned to support the still camera in a position in which there is no interference with loading and unloading and operating the movie camera.

Heretofore, tripods have been designed that will support a pair of cameras or flash synchronizers, and other photographic accessories at different levels, but insofar as I am aware the structure employed is such that the devices are above and below the tripod head, where they are inconvenient to use, and usually the tilting or rotation of the tripod head will not move the devices simultaneously while retaining them in their same relative positions.

In the present invention, the devices secured on the support, such as a movie camera and a still camera, or other photographic devices and combinations thereof, in which a predetermined directional setting of the devices relative to each other to effect a cooperative result is desired, will stay in whatever predetermined positions they have relative to each other during all movements of the support, and yet the setting of the devices relative to each other may readily be effected. This result is accomplished by an extremely simple arrangement of several relatively inexpensive parts, without requiring a special or separate screw on the support for securing the movie camera to the support. Instead, the same conventional screw on an ordinary tripod, or tripod head, that is used for a camera, will secure the multiple camera support, and one of the cameras rigidly on said head, and will indirectly hold the other camera in its desired relation to said head and to said one of the cameras.

Other objects and advantages will appear in the description and in the drawings.

In the drawings Fig. 1 is a side elevational view of the present support on a tripod head, with two cameras being indicated in position on the support.

Fig. 2 is a reduced size top plan view of Fig. 1.

Fig. 3 is a reduced size bottom plan view of the support separate from the tripod and cameras.

Fig. 4 is a side elevational view of one type of tripod head that may be used, this being conventional.

In detail, the multiple camera support illustrated in the drawings, comprises an oblong metal plate generally designated 1. This plate is preferably made of light weight metal such as aluminum, and one end portion 2 thereof (Fig. 3) is considerably thicker than the central portion 3 of the plate, and ribs 4 of a thickness equal to that of the end portion 2 extend away from said end portion to the opposite end of the plate.

The plate 1 is normally removably secured in a generally horizontal position on a tripod head, generally designated 5, and when in such position, the ribs 4 are on the underside of the plate and their lower surfaces are coplanar with the lower surface of the thickened end portion, thus a downwardly opening recess is formed on the underside of plate 1 that is closed at three sides by the thickened portion 2 and ribs 4, and the fourth side at the end of the plate opposite to said thickened portion is open. The upper side of plate 1 is flat, and is preferably continuous and planar.

In said central portion 3 along a medial line of the plate extending longitudinally of the latter, is a row of openings 6 (Fig. 2). These openings are slightly larger in diameter than the maximum diameter of the conventional screw 7 that is carried by a tripod for securing a camera on such tripod or the head thereof (Fig. 1). The thickness of the central portion 3 of the plate is such that the normal tripod screw 7 will extend freely therethrough and will project above the plate for threaded engagement in the usual tapped recess 8 (Fig. 1) formed in the base of a camera 9.

The camera 9 herein indicated, is a common movie camera having lens 10 on a turret carried by said camera, and said camera has the usual side closure 11 that is adapted to be swung laterally on hinges connecting the closure with the camera housing in which the film is held. Normally such closure is on the left side of the camera housing relative to an operator positioned at the rear side of the camera, and looking in the same direction as that in which the lens is directed.

In the drawing, the thickened end 2 of plate 1 is at the same side of the camera as the closure 11, or at the left end, and the row of openings 6 extend from a point approximately centrally of the plate 1 toward the end thereof opposite to said thickened end.

One of the longitudinally extending edges 13 (Fig. 2) of the plate 1 is the forward edge, since it is at the forward side of the plate, or at the side of the plate opposite to the operator when the camera is on the plate and the operator is behind the camera.

Adjacent to the juncture between said forward edge 13 and the end edge 14 of the plate (the latter being along the thickened portion 2) the plate is formed with a cylindrical sided vertical opening 15 (Fig. 3). This opening is adapted to snugly, but rotatably, receive a cylindrical, reduced diameter lower end portion 16 of a vertical post 17 therein (Fig. 1). Preferably the post 17 is hexagonal in cross sectional contour, and the lower cylindrical end portion 16 is formed with an axial, downwardly extending, exteriorly threaded projection 18 adapted to threadedly engage a finger nut 19 positioned below the thickened end portion 2. A downwardly directed shoulder 20 at the juncture between the hexagonal post and the end portion 16 is adapted to seat against the upper side of the thickened end portion 2 when the end portion 16 is in the opening in said end portion of the plate. The nut 19 has a hub 21 that is adapted to engage the underside of said end portion 2 so that rotation of the nut will firmly draw the shoulder 20 against the upper surface of end portion 2 to rigidly hold the post 17 on the plate 1. Upon loosening the nut 19 the post may be rotated to any desired degree in either direction and then tightened in place upon tightening the nut.

The upper end of post 17 is formed with an axially upwardly extending externally threaded projection 22 that is adapted to threadedly engage the tapped recess 23 of the same type as recess 8. This is shown in Fig. 1 in the bottom of a standard still camera 24.

The upper end of the post 17 is at a level above that of the camera 11, and the position of post 17 is such that the closure 11 on the camera 9 may be swung open without interference from the post 17 or camera 24.

The shoulder 20 on the post 17 is wide enough to provide a very secure support on the plate around the opening 15 in plate 1 and the thickness of the portion 2 of the plate provides a wide bearing surface for the lower end 16 of the post, hence the post, when secured on the plate, will be as rigid thereon as though it were integral therewith. However, upon loosening nut 19 slightly, the post may readily be rotated to obtain a very accurate positioning of the camera 24 relative to camera 11.

The tripod head 5 may be of any of the conventional forms. That is, it may be rigid with the tripod, or it may be of the type illustrated in the drawing, which type is rotatable and tiltable relative to the tripod, but which may be rigidly held in the desired adjusted position. Since the plate 1 when secured on head 5 is rigid therewith, or with the tiltable and rotatable portion of the head, it is obvious that the cameras 11, 24 will move as a unit with the head 5 upon tilting or rotating the latter.

It is equally obvious that a conventional adjustable tripod head, preferably smaller than the head 5, may be secured on the upper end of post 17 and which head may, in turn, support camera 24 thereon, thus permitting quick adjustment of camera 24 relative to camera 11. In Fig. 4 a suitable type of head is illustrated, such type being made in various sizes and they permit universal adjustment since they are of the ball and socket structure having a ball 26 that is adapted to be held in adjusted position relative to a base 27 by operation of a finger actuatable screw 28. The conventional tapped recess 29 for a screw 22 is in the base, while screw 30 on the ball is adapted to screw into the tapped recess in the camera 24.

In referring to the cameras 11, 24 it is to be understood that a still or movie camera could be held on the plate 1 while a flashlight holder or other photographic equipment fitted with a tapped recess for a tripod screw could be held on the post. Thus it is not intended that the claim necessarily be restricted to the use of the device for multiple cameras only. However, the arrangement and structure employed is particularly suitable for the combination illustrated.

The thickened end portion 2 and ribs 4 insure a rigid support for the cameras irrespective of their weight, and the plurality of holes 6 enables positioning a camera 11 of different front to rear depths on the plate without meeting with interference from post 11. The thinner central portion 3 on plate 1 enables a conventional length screw 7 to securely hold the plate and a camera 11 on head 5, which would not be possible were the central portion to have the same thickness as end portion 2 or the ribs 4.

Holes 6 in plate 1 could, of course, be connected to form an elongated slot, and the plate could obviously be formed to carry other posts for other cameras and equipment, but in any event employment of the basic arrangement shown and described in any such forms is preferable.

I claim:

A support for a pair of cameras comprising: a substantially horizontally disposed plate having a pair of adjoining side edges defining a corner portion and having a medial portion extending away from said corner portion, a vertical post secured at its lower end to said corner portion and having means at its upper end coaxial therewith for releasably securing a camera on and over the upper end of said post, a plurality of openings formed in said medial portion disposed along a straight line offset to one side of said post and progressively spaced at greater distances from said post for respectively receiving therethrough the conventional screw on a tripod head for securing different sized cameras thereto and against the upper side of said medial portion and directly over such tripod head in a position with the lateral, forward and rear sides of such camera free from interference by said post and by a camera on said post, means for rotatably securing said post to said plate whereby said post and a camera on its upper end may be rotated to different positions about the axis of said post free from interference with a camera secured on said medial portion.

References Cited in the file of this patent
UNITED STATES PATENTS 1,780,225   Moulin _____ Nov. 4, 1930
2,804,278   Jewett _____ Aug. 27, 1957